United States Patent Office 3,532,571
Patented Oct. 6, 1970

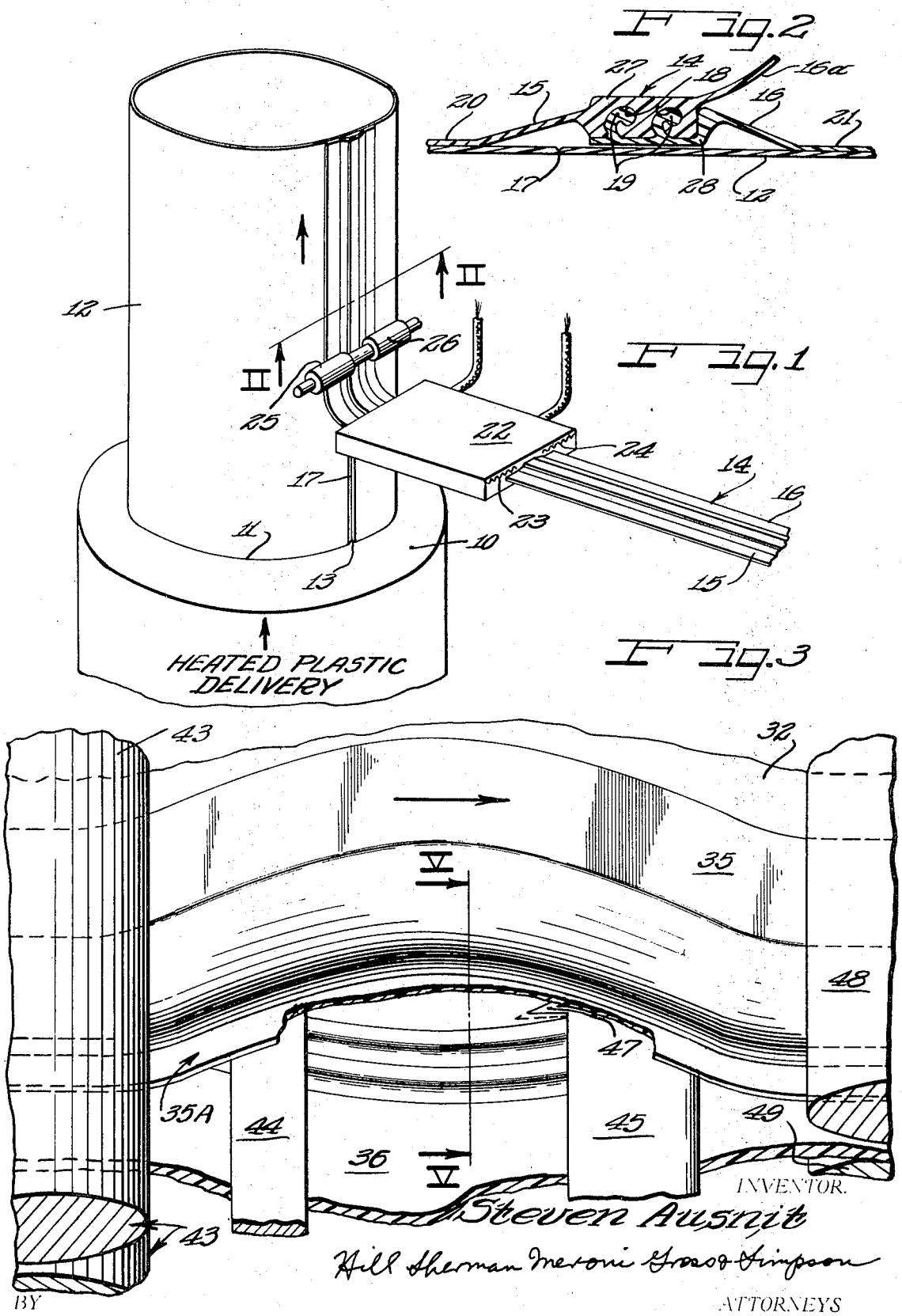

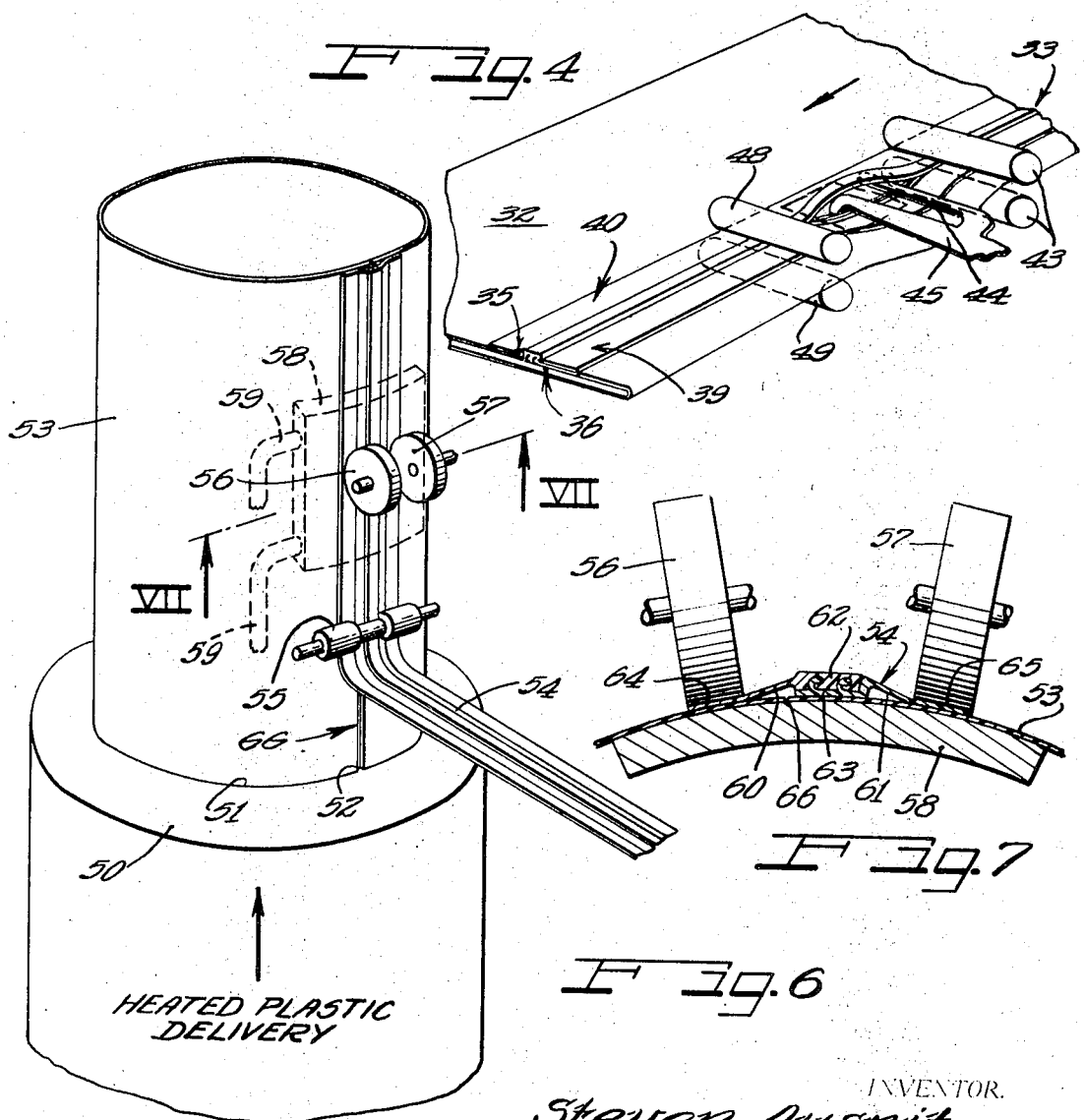

3,532,571
METHOD AND APPARATUS FOR FORMING CONTINUOUS PLASTIC TUBING WITH SEPARABLE PRESSURE RECLOSABLE FASTENER STRIPS ATTACHED TO THE SURFACE THEREOF
Steven Ausnit, Rte. 303, P.O. Box 33,
Orangeburg, N.Y. 10962
Continuation-in-part of applications Ser. No. 500,652, Oct. 22, 1965, now Patent No. 3,371,696, and Ser. No. 613,821, Feb. 3, 1967, now Patent No. 3,417,675. This application June 28, 1967, Ser. No. 649,711
Int. Cl. B32b 7/08
U.S. Cl. 156—91       11 Claims

ABSTRACT OF THE DISCLOSURE

The disclosure incorporates the method and apparatus for forming continuous plastic tubing with pressure reclosable fastener strips having profiles thereon, and the structure of the tubing and profiles, with the profiles formed in a closure strip attached to the surface of the tubing either while it is warm or after it has cooled, and a tear line formed in the tubing beneath the strip or the tubing severed beneath the strip.

BACKGROUND OF THE INVENTION

The present application is a continuation-of-part of my application, Ser. No. 500,652, filed Oct. 22, 1965, now U.S. Pat. 3,371,696 and of my application Ser. No. 613,821, filed Feb. 3, 1967, now U.S. Pat. 3,417,675.

The present invention relates to improvements in methods and mechanisms for making plastic film, preferably in the form of tubing, and to tubing with an elongate fastener strip attached to the surface thereof, which is used for making reclosable bags by cross severing and sealing of the tubing to form the individual bags.

In methods and mechanisms heretofore available, plastic film bags have been made by forming a plastic film, attaching fastener strips to the film by heat sealing, and thereafter cutting and seaming the film to form the bag. The resultant bag structure is a reclosable bag. The fastener strips are constructed so that they have interengaging plastic profiles on their edges which can be closed by pressing them together and opened by forcibly manually pulling flanges integrally extruded with them away from each other, but which remain closed during normal usage of the bag. Efforts have been made to provide methods and mechanisms of making the bags better and more rapidly by improved manufacturing methods.

It is accordingly an object of the present invention to provide an improved method and mechanism for the producing of improved plastic material used in the manufacture of plastic bags having pressure reclosable fastener elements for closing the bag opening, by manufacturing same at higher speeds than heretofore.

A further object of the invention is to provide improved method and mechanism for forming a tubular plastic film material having a fastener strip attached to the surface thereof having a tear line of weakened resistance in the tubing underneath the fastener for use in the production and manufacture of reclosable bags.

A further object of the invention is to provide an improved tubular plastic film having a multiple profile fastener strip attached to the outer surface thereof wherein the film tube has a tear line beneath the marginal portions of the fastener strip.

Other objects, advantages and features will become more apparent with the teaching of the principles of the present invention in connection with the disclosure of the preferred embodiments thereof in the specification, claims and drawings, which:

BRIEF DESCRIPTION OF THE DRAWINGS

FIG. 1 is a somewhat schematic perspective view of the mechanism and method of forming material in accordance with the principles of the present invention;

FIG. 2 is an enlarged fragmentary sectional view taken substantially along line II—II of FIG. 1;

FIG. 3 is an enlarged fragmentary plan view illustrating a step in the method of forming material in accordance with the present invention, embodying a modification of the steps used in FIGS. 1 and 2 and having a portion broken away to show the slitting operation;

FIG. 4 is a somewhat schematic perspective view of the mechanism and method of FIG. 3;

FIG. 5 is a fragmentary sectional view taken substantially along line V—V of FIG. 3;

FIG. 6 is a schematic perspective view illustrating another form of the method and mechanism of the invention;

FIG. 7 is a fragmentary sectional view taken substantially along line VII—VII of FIG. 6.

DESCRIPTION OF THE PREFERRED EMBODIMENTS

In the method illustrated in FIGS. 1 and 2, a die head 10 has an extrusion opening 11 which is shown as preferably in the form of a thin annular opening to extrude a thin tubular film. Heated plastic is delivered by suitable extruder mechanism, not shown, and a plastic material is extruded having desirable characteristics for forming a bag. For example a thin somewhat elastic polyethylene or other thermoplastic material may be used of a type which has the qualities which enable it to function best for the wall of a bag.

The die opening has a notch 13 which is of narrower width than the remainder of the opening slot 11 so as to form a line 17 of weakened tear resistance. This weakened line permits ready separation of the plastic film underneath the fastener at a later time when the reclosable fastener strip 14 is separated after the tubular material and attached fastener strip has been formed into bags. As will be recognized by those versed in the art the tubular material is cross cut and cross sealed to form a series of bags by methods well known. The sides of the slit formed along line 17 will form the opening into the bag when lip 16A is lifted and used to separate the fastener marginal portions so as to provide access into the bag and the bag will be closed when the fastener marginal portions are interlocked by being pressed together.

As illustrated in FIG. 2, the closure strip 14 has flanges or attachment areas 20 and 21 which are attached to the surface of the film 12. The sides 15 and 16 of the strip 14 have marginal portions 27 and 28 with grooves 18 in one marginal portion 27 and ribs 19 in the other marginal portion 28 which are shaped to interlock. The strip 14 is separately formed of a plastic having physical characteristics desirable for a closure strip.

The closure strip 14 is heated along its attachment areas 20 and 21 before being applied to the surface of the film 12. This is accomplished by passing through a heating plate 22 having electrical heating elements 23 and 24 positioned to heat the attachment areas 20 and 21. As the strip 14 engages the surface of the film 12, as shown in FIG. 1, pressure pullovers 25 and 26 are used to aid in applying the strip to the outer surface of the film. The film tube is pressurized from within with air as is the usual practice in extrusion processes and the film having just emerged from the die is still tacky or adhesive so that the heated attaching areas will readily adhere and join so as to form a permanent bond or union when they cool. Since only the side attaching areas 20 and 21 are heated and pressed onto the film, and the center portion of the strip 14 is not heated or pressed on, it will remain free of attachment to the surface of the film 12.

As will be noted in FIG. 2, the tear line 17 is located between the attachment areas 20 and 21 so that as the marginal portions 27 and 28 of the strip 14 are separated the film can be torn along the line 17 for access to the interior of the tube. This is preferably done after the tube has been formed into separate bags. However, in some instances the tube may be utilized or other purposes such as a tubular covering or conduit for wires, and in this case the tear line 17 will be separated at the time the tube is first used when the marginal portions 27 and 28 are separated by lifting the opening lip 16A or when the marginal portions are separated by some other means such as a slider.

In the arrangement of FIGS. 3 through 5, a plastic film is extruded without forming a tear line in the surface. In this method the film is slit or cut during the method of making the assembled structure.

As illustrated in FIG. 4, the tube 32 with the fastener strips 33 attached to it has now been collapsed and flattened having passed through a pair of nip rolls set above the extrusion opening. The tube has now also been cooled.

At some distance from the nip rolls the fastener marginal portions 27 and 28 are separated by a finger 44, so as to obtain access to the film underneath the fastener so that the film can then be slit.

An extrusion head, not shown, has an extrusion opening therein preferably annular in shape. The plastic is forced out through the extrusion opening to form a plastic film tube. The fastener strip 33 having sides 35 and 36 is attached to the surface of the film, and attachment or bonding areas are heated by a mechanism not shown and pressure rollers apply the strip 33 to the surface of the film to form the product shown in FIG. 4.

As illustrated in FIG. 5, the strip 33 has sides 35 and 36 which have flanges or attachment areas 39 and 40 secured to the surface of the film 32. The sides 35 and 36 of the strip 33 have marginal portions 41 and 42 with grooves 37 and ribs 38 respectively. The ribs and grooves are coactingly shaped so that they mate and interlock when pressed together and so that they release when forcibly drawn apart such as by gripping a flange portion 35A. Therefore, the separator finger 44 will separate the ribs and grooves as the strip 33 is forcibly pulled across it after passing between the rolls 43. In the gap formed by the separated marginal portions of the strip 33 is projected a slitter 45. The slitter has a smooth faced shoe 46 extending within the tube and has a knife edge 47 facing the oncoming film so as to form a longitudinal slit therein. The slit formed by knife edge 47 is thus located between the attachment areas 39 and 40 of the strip 33 and will afford access to the inside of the tube through the separated marginal portions 41 and 42.

As the strip 33 and the film move forward, the sides of the strip are again joined by pressure rollers 48 and 49. The pressure roller 48 forces the ribs 38 into the grooves 37 and joins the marginal portions 41 and 42 of the strip so that the completed product is a closed tube with a slit located beneath the sides of the fastener strip 33.

In the arrangement of FIGS. 6 and 7 an extruding head 50 has an extrusion slot 51 for extruding an annular tubular film 53. The slot has a notch 52 to provide a tear line 66 of weakened resistance in the film 53.

A fastener strip 54 is applied to the surface of the film, guided by the rollers 55 whch guide the strip onto the film. In this arrangement the fastener strip 54 is welded or bonded onto the film surface at a location after the film 53 has cooled and is no longer tacky. A pair of welding or sealing wheels 56 and 57 and a backing plate 58 positioned behind the sealing wheels press the sides of the fastener strip 54 against the surface of the film to create bonding or attachment areas 64 and 65, as illustrated in FIG. 7.

The backing plate 58 is positioned within the tubular film, being mounted on supports 59 which are suitably mounted on the extrusion head within the annular opening 51.

The fastener strip 54 has marginal portions 62 and 63 for each of the sides 60 and 61 and the marginal portions do not adhere to the surface of the film since the strip 54 is locally heated along the sides 64 and 65. Thus, with this arrangement, FIGS. 6 and 7, as well as with the mechanisms and methods shown in the other figures, the completed product is a continuous length of material having reclosable fastener elements which is particularly well suited to being formed into bags.

It will be understood that variations and modifications may be effected without departing from the spirit and scope of the novel concepts of this invention.

I claim as my invention:

1. A mechanism for forming a continuous material for bags with a separable pressure reclosable fastener attached which comprises:
 an extruding head having a die opening for extruding heated plastic film for bags, and
 means for delivering a plastic pressure reclosable fastener strip having separable marginal portions each with an attaching area along a path parallel to the film emerging from said head with said areas being attached to the film.

2. A mechanism for forming a continuous material for bags with a separable reclosable fastener attached in accordance with claim 1 wherein said delivering means is positioned so that the fastener strip engages the film while it is still warm and adhesive and said attaching areas adhere to the surface of said film.

3. A mechanism for forming a continuous material for bags with the separable pressure reclosable fastener attached in accordance with claim 1 including means for heating said attaching areas of said fastener strip and wherein said delivering means is positioned so that the attaching areas of the fastener strip engage the surface of the film after it has been cooled.

4. A mechanism for forming a continuous material for bags with a separable reclosable fastener attached in accordance with claim 1 wherein said die opening has a projection therein forming a thin line of weakened tear resistance in the film being aligned with said fastener strip delivering means so that the tear line is between said attaching areas and beneath the reclosable fastener strip.

5. The method of forming a continuous material for bags with a separable pressure reclosable fastener attached which comprises the steps of:
 continuously extruding a film of light weight heated plastic from a die opening with said film having physical properties ideally suited to functioning as a bag wall, and
 delivering a plastic pressure reclosable fastener strip alongside the film with the plastic of said fastener strip having physical properties ideally suited to functioning as a fastener strip and applying and attaching the fastener strip to the surface of the film.

6. The method of forming a continuous material for bags with a separable pressure reclosable fastener attached in accordance with the method of claim 5 and delivering the pressure reclosable fastener strip and applying it to the surface of the film while the film is still warm and adhesive.

7. The method of forming a continuous material for bags with a separable pressure reclosable fastener attached in accordance with claim 5 including the additional step of heating attaching areas of the fastener strip before attaching them to the surface of the film.

8. The method of forming a continuous material for bags with a separable pressure reclosable fastener attached in accordance wtih claim 5 and including the step of reducing the thickness of the extruded film in a line of weakened tear resistance extending longitudinally of the film beneath said fastener strip so that the film can be torn as parts of the fastener strip are forcibly separated.

9. A mechanism for forming a continuous material for bags with a separable pressure reclosable fastener attached being constructed in accordance with claim 1 wherein the die opening is annular providing a tubular film and the mechanism includes slitting means positioned to form a slit in the tubular film between said attaching areas so that when the marginal portions of the fastener are separated access will be afforded into the interior of the tubular film through the slit.

10. A mechanism for forming a continuous tubular material for bags with a separable pressure reclosable fastener attached being constructed in accordance with claim 1 wherein the die opening is annular providing a tubular film and the mechanism includes a projecting member having a strip separator portion for unlocking the sides of the fastener for access to the tube and having a slitting portion for cutting the tube between separated sides of the strip.

11. The method of forming a continuous material for bags with a separable pressure reclosable fastener attached in accordance wtih claim 5 wherein the film which is extruded is tubular in form and the marginal portions of the fastener are separated for access to the tube and the tubular film is slit longitudinally between the marginal portions and said portions are thereafter rejoined.

References Cited

UNITED STATES PATENTS

| | | | |
|---|---|---|---|
| 3,417,675 | 12/1968 | Ausnit | 264—174 XR |
| 3,106,941 | 10/1963 | Plummer | 24—201.3 XR |
| 2,994,469 | 8/1961 | Troup et al. | 24—205.15 |
| 3,202,559 | 8/1965 | Laguerre | 156—66 |

PHILIP DIER, Primary Examiner

U.S. Cl. X.R.

24—205.15; 138—128; 150—3; 156—244, 306, 268, 200, 210; 264—209